(12) United States Patent
Piper et al.

(10) Patent No.: US 8,494,683 B2
(45) Date of Patent: Jul. 23, 2013

(54) HYBRID IRRIGATION CONTROLLER

(75) Inventors: Matthew E. Piper, Dallas, TX (US);
Venkataramu L. Bangalore, Plano, TX (US)

(73) Assignee: Telsco Industries, Inc., Garland, TX (US)

( * ) Notice: Subject to any disclaimer, the term of this patent is extended or adjusted under 35 U.S.C. 154(b) by 272 days.

(21) Appl. No.: 12/883,922

(22) Filed: Sep. 16, 2010

(65) Prior Publication Data
US 2012/0072036 A1   Mar. 22, 2012

(51) Int. Cl.
G05D 7/00 (2006.01)
B05B 12/12 (2006.01)

(52) U.S. Cl.
USPC .......................................... 700/284; 239/69

(58) Field of Classification Search
USPC ................... 700/284; 239/69; 137/78.1, 78.2
See application file for complete search history.

(56) References Cited

U.S. PATENT DOCUMENTS

| 4,937,732 | A |  | 6/1990 | Brundisini | |
|---|---|---|---|---|---|
| 5,381,331 | A |  | 1/1995 | Mock et al. | |
| 5,568,376 | A |  | 10/1996 | Benmergui et al. | |
| 6,098,898 | A |  | 8/2000 | Storch | |
| 6,314,340 | B1 |  | 11/2001 | Mecham et al. | |
| 6,453,215 | B1 |  | 9/2002 | Lavoie | |
| 6,823,239 | B2 |  | 11/2004 | Sieminski | |
| 6,892,114 | B1 |  | 5/2005 | Addink et al. | |
| 7,010,394 | B1 | * | 3/2006 | Runge et al. | 700/284 |
| 7,058,478 | B2 | * | 6/2006 | Alexanian | 700/284 |
| 7,123,993 | B1 |  | 10/2006 | Freeman et al. | |
| 7,266,428 | B2 | * | 9/2007 | Alexanian | 700/284 |
| 7,412,303 | B1 |  | 8/2008 | Porter et al. | |
| 7,444,207 | B2 |  | 10/2008 | Nickerson et al. | |
| 7,844,368 | B2 | * | 11/2010 | Alexanian | 700/284 |
| 8,200,368 | B2 | * | 6/2012 | Nickerson et al. | 700/284 |
| 2003/0093159 | A1 |  | 5/2003 | Sieminski | |
| 2004/0030456 | A1 |  | 2/2004 | Barlow et al. | |
| 2004/0039489 | A1 |  | 2/2004 | Moore et al. | |
| 2006/0122736 | A1 | * | 6/2006 | Alexanian | 700/284 |
| 2007/0191991 | A1 |  | 8/2007 | Addink | |
| 2008/0091307 | A1 | * | 4/2008 | Dansereau et al. | 700/284 |
| 2010/0010682 | A1 |  | 1/2010 | Cardinal | |
| 2010/0145530 | A1 | * | 6/2010 | Nickerson et al. | 700/284 |
| 2010/0145531 | A1 |  | 6/2010 | Nickerson et al. | |

* cited by examiner

Primary Examiner — Charles Kasenge

(57) ABSTRACT

The present invention is directed to a system, method and software program product for detecting and counteracting a temperature sensor failure with an irrigation controller operating in auto adjust watering mode. A plurality of pseudo temperature data are created from solar radiation for a particular location using unique pseudo temperature conversions for each temperature parameter. The pseudo temperature values can be compared to corresponding measured temperature values from the sensor to validate the integrity of the measurement. These pseudo temperature values are used in place of the measured temperatures for calculating a potential evapotranspiration water deficit for the site. Furthermore, if some valid measured temperature data existed prior to the sensor failure, the measured temperature data is compared to the corresponding pseudo temperature data. Any differences detected between the two values can be used to correct the pseudo temperature toward the measure temperature. The accuracy of the potential evapotranspiration water deficit using the corrected pseudo temperature values approach that of using measured temperature values.

32 Claims, 6 Drawing Sheets

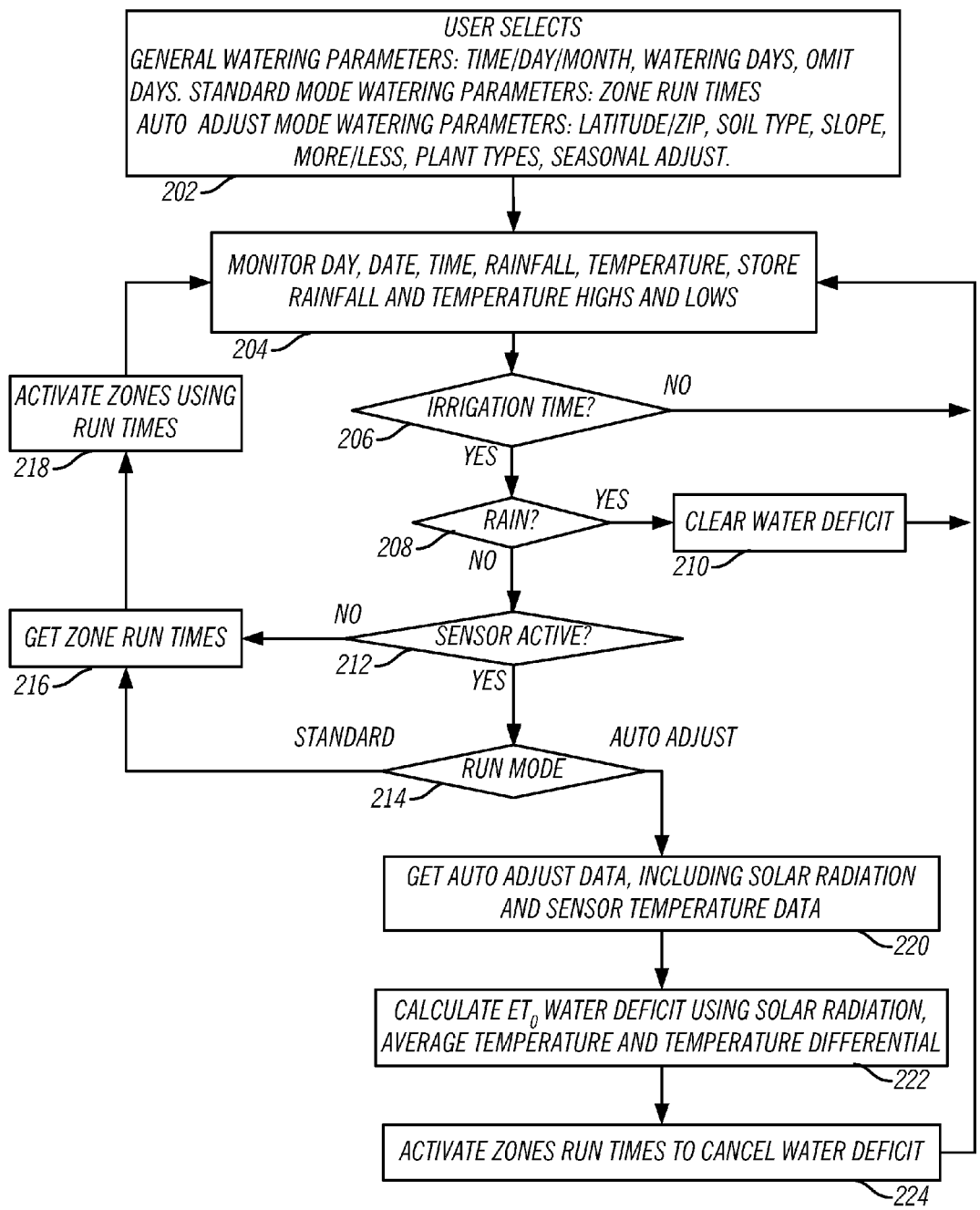

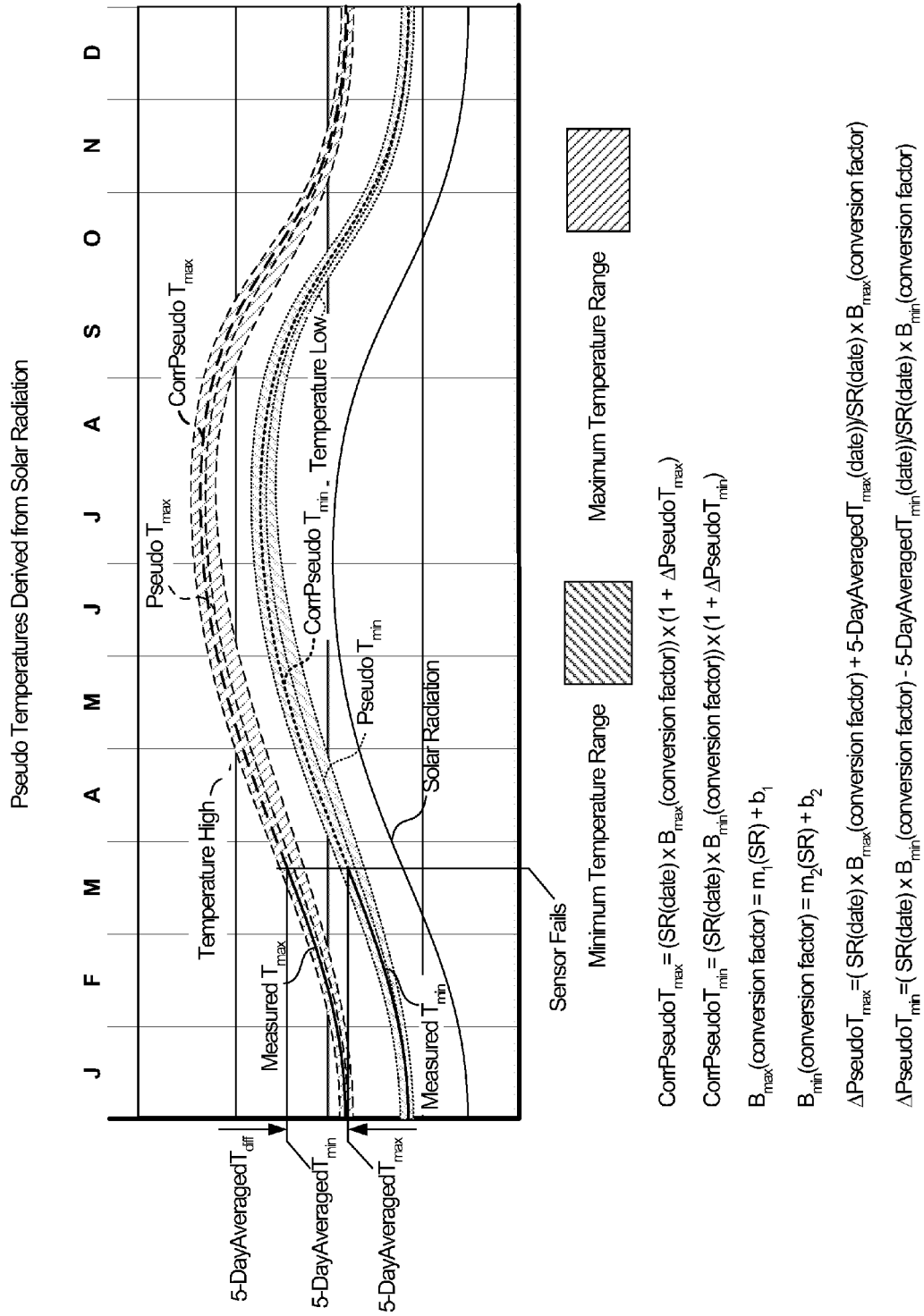

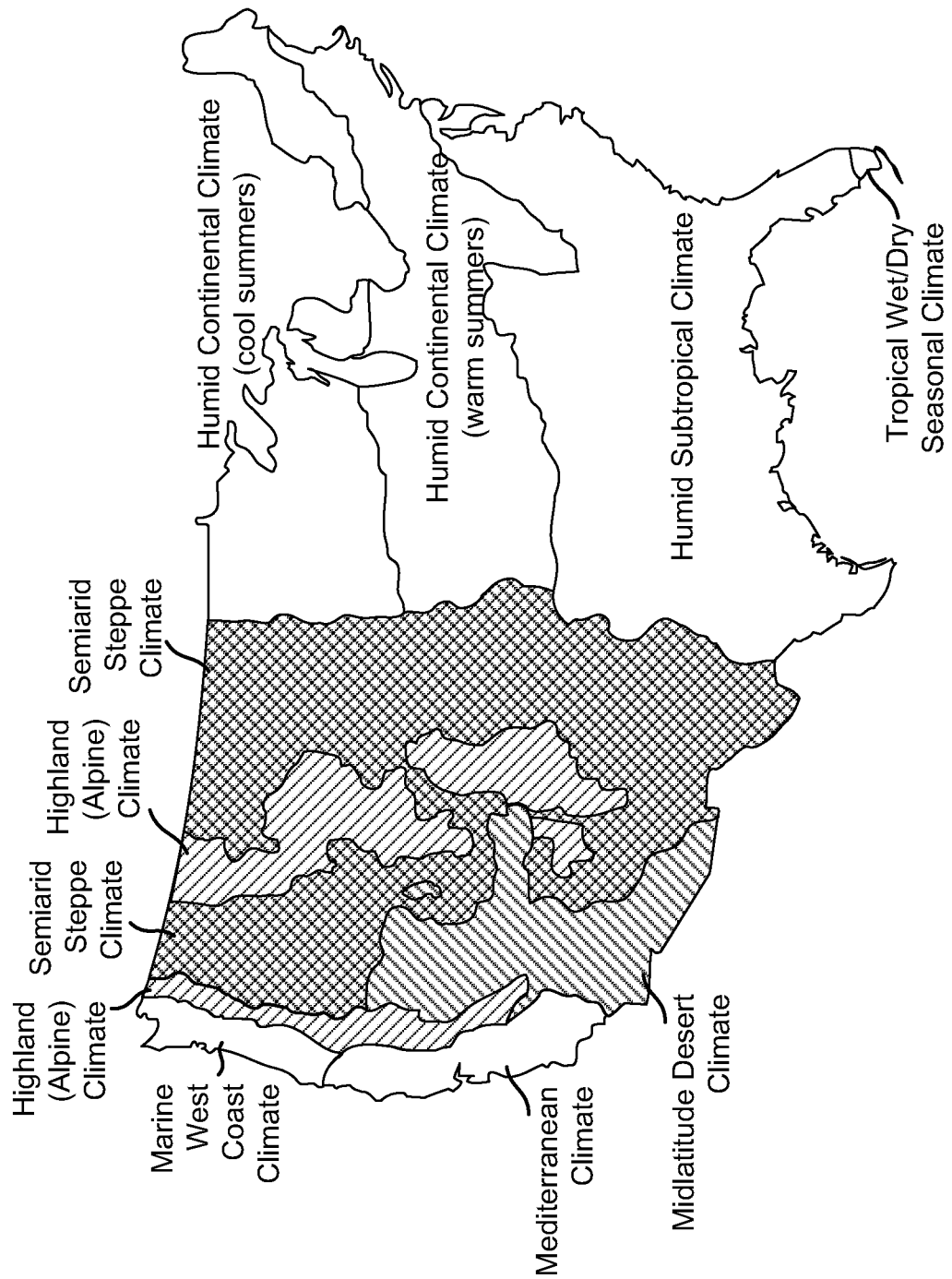

US 8,494,683 B2

HYBRID IRRIGATION CONTROLLER

BACKGROUND OF THE INVENTION

The present invention relates generally to advanced irrigation controllers that utilize evapotranspiration algorithms for calculating water requirements and the use of temperature data with those algorithms. More particularly, the present invention relates to a system, method and software program product for obtaining pseudo temperature values for use in evapotranspiration calculations. The present invention relates further to detecting errors and correcting measurements in auto adjust watering mode of an advanced irrigation controller from a sensor failure.

Advanced irrigations controllers are well known for automatically adjusting the irrigation cycles for the amount of water needed by the plants in the irrigation zones. An advanced irrigation controller may have at least two operating modes: standard watering mode (or timed mode), in the absence of weather data and auto adjust watering mode (or ET mode) using weather parameters collected either on site or remotely delivered to the advanced irrigation controller by various mechanisms. In standard watering mode, the controller determines the activation time for each irrigation zone at each irrigation day and time by retrieving the run times for the respective irrigation zones under the control of the irrigation controller. The run times were manually input in the controller by the operator or may be default run time settings. Then, the controller activates an irrigation valve for each irrigation zone for that zone's run time.

Determining the zone activation times in auto adjust watering mode is far more complicated. Essentially, the controller attempts to determine how much water should be dispersed to each zone based on plant watering needs and then how best to disperse the water to limit the amount of runoff and evaporation. The former generally comprises finding a potential evapotranspiration ($ET_0$) plant water deficit from the temperature measured at the site and the solar radiation for the latitude of the site, from memory, using the current date. The irrigation controller then adjusts the ET water deficit for the types of plants in a particular irrigation zone (and any rainfall). The controller determines how best to distribute the water based on how fast the water will be absorbed into the soil from the type of soil at each zone and how much irrigation water will run off the zone from the inclination at each zone (values for each of these are manually entered for the site by the operator). The above description is merely exemplary for describing the operation of the present invention, some controllers utilize other factors for making these calculations, such as for instance root zone depth.

With reference to the temperatures, many advanced irrigation controllers use the Hargraves evapotranspiration algorithm (or a modified Hargraves' algorithm) that computes a potential $ET_0$ plant water need (the water deficit) from only three variables: the daily solar radiation, the daily average temperature and the daily temperature differential. The temperature values are received from a temperature sensor on the site. If the sensor is not available, then the controller automatically reverts to standard watering mode. These temperature values from the temperature sensor are usually in the form of a daily minimum temperature and a daily maximum temperature and provide the basis for the average temperature value and the temperature differential value used by the Hargraves' algorithm to predict the water deficit. In some controllers, the temperature values will be averaged over a two-, three-, or five-day time period to avoid poor water deficit predictions from anomalies in the daily temperature values.

While running in auto adjust watering mode, the controller is receiving at least daily communication from the remote sensor, i.e., with the minimum and maximum temperatures for the preceding 24 hour period. If a daily measurement is not received for any reason, the controller may be able to find acceptable values for minimum and maximum temperatures from the averages of several days' values. The water deficit from Hargraves' algorithm may still be acceptable using the average temperatures even assuming the daily temperature data for a single day are erroneous. If however, the irrigation controller fails to receive daily temperature data for a prolonged period, for instance for a three or five-day time period, the controller may bypass the sensor altogether, hence, the controller will revert to standard watering mode which does not utilize temperature data from the sensor.

Reverting to the standard watering mode in case of an auto adjust failure, i.e., a sensor failure, is advantageous because it is assumed that the manually entered run times (or the default run times) will provide a sufficient amount of irrigation time to offset the water deficits of the respective irrigation zones, hence the plants will not suffer. More advanced irrigation controllers will display to the operator which operating mode the controller is currently operating and whether the sensor is currently active or bypassed. The operator can then take whatever diagnostics steps are necessary to evaluate the operation of the irrigation controller and/or the sensor.

The disadvantage of the irrigation controller automatically reverting to standard watering mode is that the manually entered run times are static, therefore, usually set for peak summer conditions where the ET water deficit is high (the plants require a significant amount of water). If the auto adjust failure occurs in the winter months when the ET water deficit is low (the plants require a relatively insignificant amount of water), then a vast amount of irrigation water may be wasted. It is not uncommon for the monthly irrigation water costs between summer and winter to vary by between $10,000 and $60,000 for a single 48-zone irrigation controller on a commercial property. Therefore, an auto adjust failure in the winter months has the potential to cost the property owner between $10,000 and $60,000 for that single 48-zone irrigation controller.

BRIEF SUMMARY OF THE INVENTION

The present invention is directed to a system, irrigation controller, method and software program product for the creation of pseudo temperature data for use in an advanced irrigation controller. The pseudo temperature data can be used to test the current measured temperature data or as a substitute for the current measured temperature data in evapotranspiration algorithms used by the irrigation controller. Alternatively, the present invention is directed to handling a temperature sensor failure with an irrigation controller operating in auto adjust watering mode. Typically, the temperature data includes the maximum and minimum temperatures over a day, the temperature difference between the maximum temperature and minimum temperature in a day, the average or median temperature in a day, or any of above averaged (or median) over a particular time period, for instance several days.

The present invention recognizes that the character of a solar radiation plot over a repeating time period, for instance a year, is indicative of the character of a temperature plot over the same repeating time period. Thus, it is possible to define a set of pseudo temperature conversions for converting values of solar radiation to temperature values for any of the above-identified temperature data within the time period. The precise pseudo temperature conversions directly relate to the latitude and, perhaps, the climatic conditions (for instance the climate zone) of the location. Generally, the solar radiation data are determined by the latitude of the site and used to create generic pseudo temperature data for the latitude. While the generic pseudo temperature data for a latitude may suffice for some conditions, greater accuracy in calculating evapotranspiration values for a site can be verified by modifying the generic pseudo temperature data for the climate zone or region in which the site is located. The climatic information is used to fine tune the generic pseudo temperature ranges for the particular climatic at the site. These pseudo temperature values can be further altered by comparing pseudo temperature data with corresponding measured temperature data, if available, for a temporal time period. The difference between the two sets of data can be used to adjust the pseudo temperatures toward the measured temperatures. These corrected pseudo temperatures approximate the measured temperature values but generally do not duplicate the measured temperature values. The pseudo temperature values or the corrected pseudo temperature values are used in an evapotranspiration algorithm within an advanced irrigation controller to calculate the potential water deficit of the plants on the site.

Alternatively, pseudo temperatures, pseudo temperature data and/or the set of pseudo temperature conversions may be manually entered into the irrigation controller by the operator. Furthermore, regardless of the origin of the pseudo temperature data, the operator can manually verify the accuracy of the pseudo temperatures using the evapotranspiration calculations by comparing the pseudo temperature-derived evapotranspiration values with corresponding historic evapotranspiration values for the identical time period. If necessary, the operator can then manually adjust the calculated evapotranspiration values toward the historic evapotranspiration values using a MORE/LESS control.

Additionally, the pseudo temperature values can be compared to corresponding measured temperature values received from a temperature sensor to validate the integrity of the temperature measurement. If the measured temperature data fails to validate, the pseudo temperature data is used in its place.

Advanced irrigation controllers generally operate in standard water mode, where a plurality of predetermined zone run times are used for activating the separate irrigation zones, and auto adjust watering mode where the advanced irrigation controller receives measured temperature data from a temperature sensor that is used in an evapotranspiration algorithm with solar radiation data for the site to determine the potential water usage or deficit of the plants at the site. If the sensor fails while operating in auto adjust watering mode, the controller creates pseudo temperature data from the solar radiation values for continuing in the more accurate and efficient auto adjust watering mode.

BRIEF DESCRIPTION OF THE SEVERAL VIEWS OF THE DRAWINGS

The novel features believed characteristic of the present invention are set forth in the appended claims. The invention itself, however, as well as a preferred mode of use, further objectives and advantages thereof, will be best understood by reference to the following detailed description of an illustrative embodiment when read in conjunction with the accompanying drawings wherein:

FIG. 2 is a flowchart of the watering modes of an advanced irrigation controller including the automatic reversion into auto adjust watering failure mode as known in the prior art;

FIG. 3 is a diagram depicting the relationship between the annual plot of the solar radiation and annual plots of the temperature minimum and temperature maximum at a site in accordance with exemplary embodiments of the present invention;

FIG. 4 is a diagram illustrating the climate zones in the United States; and

Figure 1:
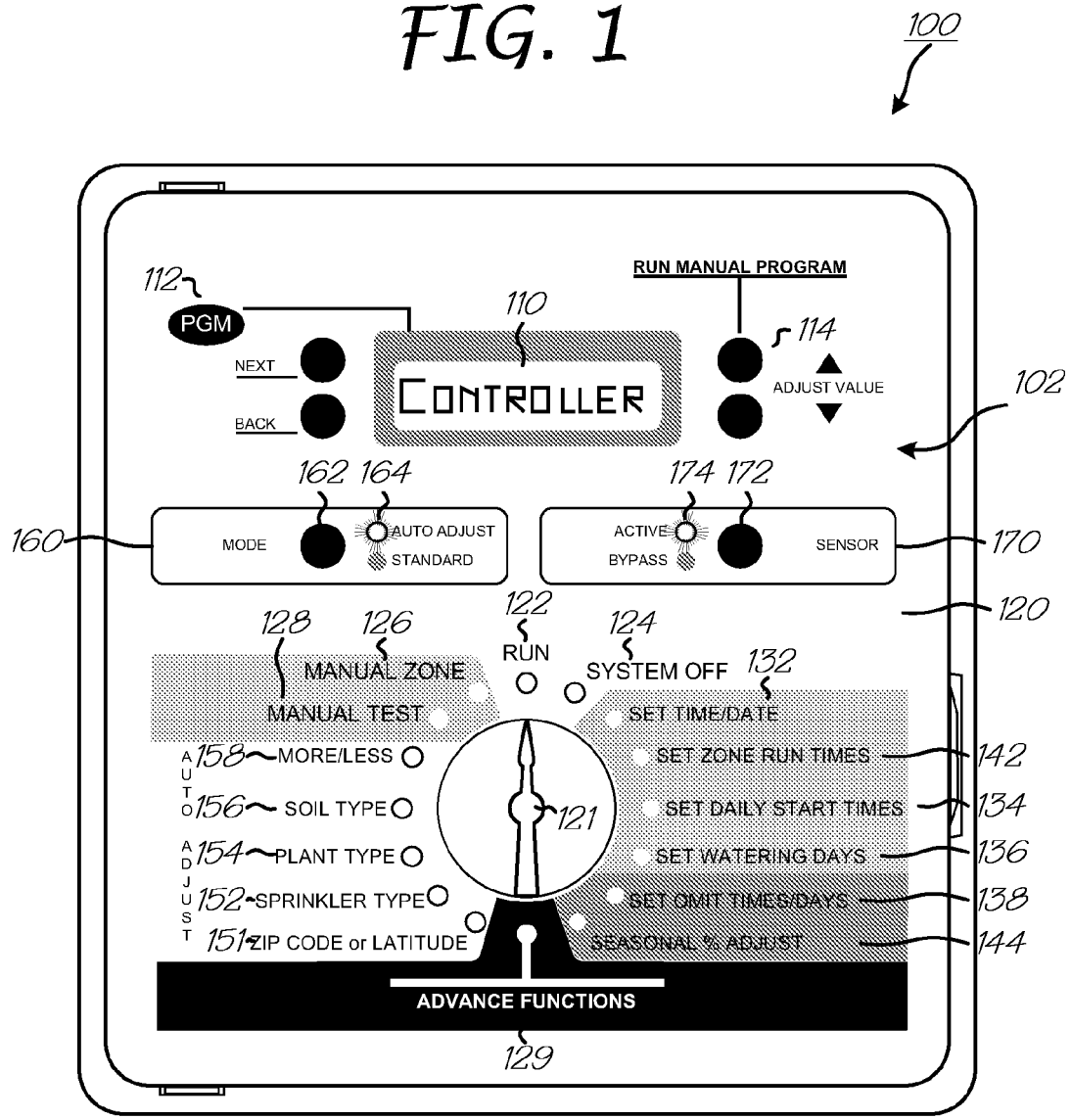
FIG. 1 is an illustration of the face of an advanced irrigation controller as known in the prior art.

Other features of the present invention will be apparent from the accompanying drawings and from the following detailed description.

DETAILED DESCRIPTION OF THE INVENTION

| Element Reference Number Designations | |
|---|---|
| 100: | Irrigation controller |
| 102: | Front panel |
| 110: | Display |
| 112: | Programming selection buttons |
| 114: | Value adjust buttons |
| 120: | System positions |
| 121: | Position selector switch |
| 122: | System RUN position |
| 124: | System OFF position |
| 126: | System test, manual zone position |
| 128: | System test, manual test position |
| 130: | Watering parameter positions |
| 132: | Day, date and time set position |
| 134: | Watering start times position |
| 136: | Watering day position |
| 138: | Omit watering day position |
| 140: | Standard watering mode positions |
| 142: | Zone watering run times position |
| 144: | Seasonal % adjust position |
| 150: | Auto adjust watering mode positions |
| 151: | ZIP code or latitude position |
| 152: | Sprinkler type position |
| 154: | Plant type position |
| 156: | Soil type/slope position |
| 158: | More/less position |
| 160: | Watering mode section |
| 162: | Watering mode selection button |
| 164: | Watering mode indicator lights |
| 170: | Sensor mode section |
| 172: | Sensor mode selection button |
| 174: | Sensor status indicator lights |

In the following description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following description is, therefore, not to be taken in a limiting sense. For clarity of exposition, like features shown in the accompanying drawings are indicated with like reference numerals and similar features as shown in alternate embodiments in the drawings are indicated with similar reference numerals.

FIG. 1 is an illustration of the face of an advanced irrigation controller as known in the prior art as used for multi-wire irrigation systems in which one signal wire is used to control each irrigation zone in a multi-wire irrigation system. A multi-wire irrigation system is evident by the number of control wires employed, i.e., a forty-eight station irrigation system would require forty-eight separate conductors to be coupled between an irrigation controller and the solenoid activated irrigation valves, in addition to a return conductor. Front panel 102 of advanced irrigation controller 100 generally comprises a user interface, such as knobs, buttons, switches and other interface objects for receiving user interactions to the controller for inputting and selecting various values for settings and/or modifying irrigation schedules. Display 110 allows the user to view entry parameter values, schedules, times, dates, diagnostic and programming information. Such controllers are well known in the irrigation industry, for instance the SmartLine SL1600 Irrigation Controller (available from and a registered trademark of Telsco Industries Inc. of Garland, Tex.).

When using advanced irrigation controller 100, it is incumbent on the operator to set certain programming parameter values to ensure optimal operation of the controller. Set up will be described with regard to three types of parameters: general watering parameters 130; standard watering mode parameters 140; and auto adjust watering mode parameters 150, although most manufacturers do not use this exact nomenclature, the purpose of setting these type of parameter values will become apparent from the discussion below.

Initially, the operator uses position selector switch 121 to set up the general watering parameters 130, such as time/date position 132. In that position, the operator uses programming buttons 112 to select time/date position 132 to specify time values, such as 04:58 PM. In that position, one parameter will be blinking, for instance the hour value "04." Using value adjusts buttons 114, the operator advances or retards the hour parameter value to the correct hour. The operator repeats the process for the minute and the meridiem parameter values. Next, the operator selects the date parameter with programming buttons and changes the date parameter values to the current date just as described above. Additionally, the operator selects daily start watering times position 134 and selects a time for the irrigation water cycle to commence and then sets watering days position 136 to select the watering days to create a watering schedule. The watering days may be selected as day names, i.e., MON through SUN, odd even dates, watering interval, i.e., 1 (watering every day) to 30 (watering every 30 days) or others. Typically, a conventional advanced irrigation controller will store unique days and start times for multiple unique irrigation watering schedules. Each unique watering schedule can be indexed to a schedule identifier code using programming buttons 112, such as watering schedules "A," "B," "C" and so on. Often, these schedules correspond to watering days and time set by the municipality for the site. Finally, the operator selects omit times/days position 138 which overrides daily start time 134 and watering days 136 to cancel watering during certain time periods, for instance a municipality may authorize irrigation watering at a site on odd dates but not on Sundays. In that case, watering is omitted for the day "SUN" using programming buttons 112 to select DAY and value adjust buttons 114 to select a day value of SUN. Typically, an advanced irrigation controller will utilize general watering parameters 130 in conjunction with both standard watering mode parameters 140 and auto adjust watering mode parameters 150.

Programming standard watering mode parameters 130 is essentially a two step process, selecting zone run times position 142 using position selector 121 and selecting the zone run time values, and then selecting seasonal % adjust position 144 and adjusting the zone run time monthly percentages. When programmed correctly, a zone that is allocated, for instance, a 10 minute run time in July may be reduced by 50% or more (to 5 minutes) for January and February and 70% for March and December (to 7 minutes). In so doing, the run times are reduced for non-peak growing months. Often, irrigation system installers will omit these steps in lieu of programming the controller for operation in only the more efficient auto adjust watering mode. Programming the controller for operating in standard watering mode is often understood to be unnecessary, as the controller will never operate in standard operating mode. Furthermore, most conventional controllers are preprogrammed with zone run time defaults, for example 10 or 15 minutes.

For operating in the STANDARD watering mode, the operator selects STANDARD with mode button 162 in watering mode section 160 and in response the LED adjacent to STANDARD is illuminated (not depicted in the figure). If a sensor is present, such as a rainfall sensor, temperature sensor or a combination weather sensor with a rainfall sensor, temperature sensor and perhaps other sensors, the operator uses sensor selection button 172 in sensor mode section to illuminate the ACTIVE LED (as depicted).

Setting up advanced irrigation controller 100 for operating in auto adjust watering mode is only slightly more complicated than operating in standard watering mode, however operating in auto adjust watering mode is much more complicated with regard to automatically calculating ET water deficits. Calculating the ET water deficits using, for instance, a modified Hargreaves' algorithm requires three values: a solar radiation value obtained from memory using the site's location (ZIP code or latitude) and the current date); an average temperature and a temperature differential between the highest temperature measured at the site and the lowest temperature measured at the site. Usually, a high temperature value and a low temperature value is retained at the sensor and communicated to advanced irrigation controller every 24 hour period. The controller uses a temperature algorithm to derive the average temperature and temperature differential from the maximum and minimum measured temperatures.

The setup is actually simplified for the base ET water deficit calculations, by merely selecting ZIP code/latitude position 151 and entering either the ZIP code or latitude for the site. With this sole selection, irrigation controller 100 can calculate a highly accurate potential evapotranspiration water deficit (sometimes referred to as $ET_0$ water deficit). However, the amount of water delivered to the zone is affected by the type of sprinklers used in the zone (selected at sprinkler type position 152) and the precise amount of water used by a species of plant is based on the type of plant (ET crop coefficient is selected at plant type position 154). With these selections, advanced irrigation controller 100 will calculate the water use of plants in each zone of the auto adjust watering mode. The effective delivery of the correct amount of water to the plant is further ensured by soil type position 154 where the type of soil in each irrigation zone, as well as the slope are selected. These selections do not change the amount of water delivered to the zone, but do change the amount of water delivered in one interval. In order to avoid water pooling on top of clay soil, or running off of zone with high slope angles, the controller meters out small amounts of irrigation water with enough time in between that water percolates into the ground. Hence, less irrigation water evaporates or runs off of the soil.

The auto adjust watering mode of advanced irrigation controller 100 is extremely effective in assessing the amount of irrigation water needed by plants in the irrigation zones to satisfy the evapotranspiration for the weather conditions. Furthermore, the auto adjust ET water deficit calculations are dynamic, changing with the weather conditions. For instance, the ET water deficit calculated for long periods of cloudy weather with depressed temperatures correctly mimics the lowered plant water needs for those conditions as it would do for periods of continuous sun where the water needs of plants is far greater. While at first blush the water savings by operating in auto adjust watering mode may seem unremarkable, it often results in water reductions of 20% to 50%. The corresponding saving to a commercial property owner can easily exceed ten of thousands of dollars. However, in order to accurately calculate the ET water deficits, the irrigation controller must have accurate temperature data from the site. If not, the controller attempts to rectify the problem by invoking an auto adjust watering failure mode.

Before proceeding with the description of the present invention it should be appreciated that the failure of a temperature sensor at a site is an absolute certainty, not if, but when. Weather sensors, as well as the batteries that power them, have limited product lives and are generally far more susceptible to failure than irrigation controllers that utilize them. However, the failure of a weather sensor is not analogous to the loss of ancillary equipment but instead is a systemic failure of the irrigation system. The loss of accurate measured temperature data is equivalent to the loss of almost all other irrigation variables used by an advanced irrigation controller, i.e., sprinkler type data, plant type data, soil type data, root zone information, etc. As will be appreciated from the following description, the present invention ensures system integrity is maintained by replacing measured data with pseudo data that precisely mimics the measured data.

FIG. 2 is a flowchart of the watering modes of an advanced irrigation controller including the automatic reversion into auto adjust watering failure mode as known in the prior art. The process begins in setup phase as discussed above (step 202). Once setup is complete, the controller is switched to run position 122 and begins monitoring time (i.e., current day, date and time), rainfall, temperature (maximum and minimum temperatures) and stores the rainfall events and temperature data (step 204). The system tests for an irrigation time (step 206) and iterates between step 204 and 206 until an irrigation time is detected. Once an irrigation time has been detected, the controller checks its memory for a rainfall event (step 208). If a rainfall event occurred after the last irrigation time, it is assumed that the plants water needs have been met and any remaining water deficit is cleared (step 210) and the process reverts to step 204 for monitoring and testing irrigation times. If no rainfall has occurred, the controller checks it for sensor activity (step 212). As discussed above, more advanced irrigation controllers continually check for communication between the controller and the weather sensor. Hereinafter, the terms weather sensor and temperature sensor will be used synonymously, both referring to a sensor for communicating at least temperature data to an irrigation controller. If, after a predetermined number of days, perhaps three or five, no communication is received from the weather sensor, the sensor is automatically bypassed (ACTIVE LED is deactivated and BYPASS LED 174 is illuminated). Advanced irrigation controller 100 cannot operate in auto adjust water mode without measurements from the weather sensor, so in response to sensor section 170 switching to BYPASS mode, operating mode section 160 also switched modes, from auto adjust watering mode to standard watering mode (the AUTO ADJUST LED deactivates and the STANDARD LED is illuminated in operating mode section 160). Therefore, if the sensor activity test is negative, the irrigation controller retrieves the zone run times from memory (step 216) and activates the irrigation zones using the respective zone run times (step 218). The process reverts to step 204 for monitoring and testing irrigation time.

If, at step 212 the weather sensor is active, then the controller may operate in auto adjust watering mode, but does not necessarily do so (step 214). If operating mode section 160 is set to standard watering mode, the process continues as discussed above in standard watering mode by getting the zone run times (step 216) and activating the irrigation zones based on the zones' run times (step 218). Here again, the process reverts to step 204 for monitoring and testing irrigation time. If, however, at step 214 the operating mode is set to auto adjust watering mode, then the controller gets the data necessary for calculating a potential evapotranspiration water deficit ($ET_0$), including the solar radiation for the current date and the maximum and minimum temperatures generated by the sensor (step 220). The $ET_0$ is calculated and the water deficit for each irrigation zone adjusted for crop and soil conditions (step 222) and finally, the irrigation zones are activated to cancel the water deficit (step 224). The process continues in the next irrigation cycle by reverting to step 204 for monitoring and testing irrigation time.

The method for reverting to auto adjust watering failure mode enables advanced irrigation controller 100 to automatically revert to standard watering mode in cases where the weather sensor is not active, i.e., the irrigation controller has not received communication from the sensor for a predetermined number of days. This allows plants on the site to thrive, especially in the summer months and even in cases where the installer did not set up the zone run times during set up, as the default zone run times usually provide more than enough irrigation time. However, the prior art auto adjust watering failure mode has several severe drawbacks. Firstly, even if the installer sets the zone run times, these are merely estimates of the water needs of plants in the respective zone and do not dynamically adjust the amount of irrigation water on the plants' watering needs based on weather information. Also, the standard watering mode is inherently far less efficient in the winter months. This inefficiency is compounded because the installers almost always omit setting the seasonal % adjustment, but instead rely heavily on the auto adjust watering mode. Hence, the irrigation controller usually delivers as much irrigation water in the winter months in auto adjust failure mode, as in the summer months. This can result is substantial additional operation costs (between $10,000.00 and $60,000.00 per controller for an irrigated area of moderate size).

Finally, most conventional advanced irrigation controllers have no way to interrogate the accuracy of temperature data received from the weather sensor. Therefore, it is possible for a faulty temperature sensor to deliver erroneous temperature to the controller, which then uses those temperatures to calculate an erroneous potential evapotranspiration ($ET_0$) water deficit. Faulty temperature measurements are far more difficult to detect than a communications error because the irrigation controller remains in auto adjust watering mode, with AUTO ADJUST LED 164 illuminated and sensor LED 174 ACTIVE also illuminated. The primary diagnostic method to detect this condition is by the property manager diligently tracking the water usage with previous year's usage for corresponding months. This is, of course, impractical in the first year of operation.

The shortcomings discussed above may be alleviated by using pseudo temperature data for the site. The pseudo temperature data may be manually entered by the operator using common knowledge of the site of empirical historical temperature collected for the site or instead may be automatically generated internally within the irrigation controller from latitude and climatic information. The pseudo temperature data for the site may be used with the ET algorithm and/or for verifying the integrity of the measured temperature data in accordance with exemplary embodiments of the present invention. The purpose of the pseudo temperature is to mimic the measured temperature data. Initially, it should be understood that although the present invention will be described in terms of creating high and low pseudo temperatures to mimic a particular type of temperature sensor (or weather station), the techniques discussed are equally valid for creating other types of pseudo temperature data, for example temperature differentials, average temperatures, median temperatures, etc. One of ordinary skill in the art would be able to use the techniques to create pseudo temperature data for any type of sensor or for any purpose that might present itself for use in an irrigation controller.

Essentially, the temperature of a site directly correlates to the solar radiation received at that site, hence, the character of an annual plot of the solar radiation is similar to the character of an annual plot of the temperature data for the site. Therefore, in accordance with one exemplary embodiment of the present invention pseudo temperature date is derived from the solar radiation by use of a pseudo temperature conversion. Optimally, the pseudo temperature data should closely track the historic temperature data for the site, but without having to devote the memory space for retaining a large amount of historic temperature data.

FIG. 3 is a diagram depicting the relationship between the annual plot of the solar radiation and annual plots of the temperature minimum and temperature maximum at a site in accordance with exemplary embodiments of the present invention. The curves and elements in the figure are labeled with nomenclature identical to that used herein, rather than element numbers, for simplicity and ease of understanding the present concepts. One mechanism for providing a pseudo conversion is by way of the slope/intercept formula, Y=mx+b, hence the conversion factor for the PseudoT$_{max}$ can be written as B$_{max}$(conversion factor)=m$_1$(SR(date))+b$_1$, where SR(date) is the solar radiation value at a particular date. The PseudoT$_{min}$ conversion is similar, B$_{min}$(conversion factor)=m$_2$(SR(date))+b$_2$, generally m$_1 \neq$m$_2$ and b$_1 \neq$b$_2$, but it may be possible to use common slope and intercept values for T$_{max}$ and T$_{min}$. It can be appreciated from the diagram that the temperature values lag the solar radiation values by a number of days (usually between 20 and 32 days). Therefore, the date for the solar radiation might precede the current date, for example Date=CurrentDate−z, where 20≦z≦32. Conversion factors B$_{max}$ and B$_{min}$, as well as any date shift (z), are determined by the location of the site. However, the conversion factors for a site are not entirely dependent on solar radiation, and therefore, the conversion factors do not depend only on the latitude of the site (as does the solar radiation). The conversion factors also depend on the climatic conditions for the location of the site. The climatic conditions for locations may be represented in a variety of ways, for example using plant hardiness zones, climate zones or the like which distinguishes one area from another based on climatic conditions. These climatic conditions may be referenced internally within advanced irrigation controller 100 to one of an address for the site, a ZIP code for the site, a latitude and climatic condition description for the site, a latitude and a longitude for the site or another coordinate description for the site location.

Generally, the solar radiation data obtained from the site latitude enable a set of generic conversion factors B'$_{max}$ and B'$_{min}$ for the latitude that will result in the creation generic pseudo temperature data for the latitude. The use of generic pseudo temperature data in an ET algorithm provides a much more accurate irrigation solution than timed irrigation, but not the most accurate solution. Greater accuracy in calculating evapotranspiration values may be achieved for a site by modifying the generic pseudo temperature data for the climate zone or region in which the site is located, hence the generic conversion factors B'$_{max}$ and B'$_{min}$ are fine tuned for the particular climate region or zone at the site along the latitude. The pseudo temperature data derived using conversion factors B$_{max}$ and B$_{min}$ are far more representative of the temperatures at the site than the generic pseudo temperatures, but may still have room for improvement. Still more accurate pseudo temperature data and/or evapotranspiration data for the site may be achieved in one of two ways. First, if measured temperature data is available for the site, such as from a time period prior to a temperature sensor failure, the pseudo temperature data can be biased with the measured temperature data. For example, a set of pseudo temperature data may be calculated for the time period corresponding to a recent time where measure temperature data are available and the pseudo temperature data compared with the corresponding measured temperatures. The conversion factors B$_{max}$ and B$_{min}$ can then be modified, if need be, to adjust the pseudo temperature values toward the measured temperatures. Alternatively, the operator can manually adjust the pseudo values using comparable historic values. For this adjustment it is, perhaps, more advantageous to make corrections on the evapotranspiration values calculated from the pseudo temperature data itself since the evapotranspiration uses all of the relevant temperature data (i.e., less manual entry). This modification is accomplished by comparing the calculated evapotranspiration values to authoritative evapotranspiration values for the site, such as those available from a state, federal or academic agricultural or weather/atmospheric authority. The calculated evapotranspiration can then be modified, if need be, toward the authoritative evapotranspiration values for the site. This modification is most effectively implemented as a manual adjustment using, for example, a MORE/LESS control on a user interface to the irrigation controller.

FIG. 4 is a diagram illustrating the climate zones in the United States. Most latitudes intersect at least four unique climate zones (with the exception of the most southern United States). Therefore, the operator may enter at least a unique climate zone and the latitude of the site in the set up phase of advanced irrigation controller 100 for creating more accurate or representative pseudo temperatures for the site. However, because the climate zones are not always known or understood by operators, installers or property owners, it is more practical to associate the pseudo temperature conversions with ZIP codes, thus the operator need merely enter the ZIP code for the site and advanced irrigation controller 100 will access the correct pseudo temperature conversions for the site.

Returning to FIG. 3, the computation of PseudoT$_{min}$ and PseudoT$_{max}$ has two distinct benefits. First, an advanced irrigation controller can run in auto adjust water mode without receiving real time temperature data from a weather station; and second, the pseudo temperatures can be used to interrogate the validity of the current measured temperature data received from a weather station. In the case where the irrigation controller is set to the auto adjust watering mode, but no temperature data is received from a temperature sensor or weather station, the controller merely utilizes the pseudo temperature conversions to create pseudo temperatures from the solar radiation that are, in turn, used in the ET water deficit calculations. The water deficits should closely correlate to historic water deficits for the area.

Furthermore, in cases where current measured temperature data are received at the irrigation controller, the controller can test the validity of the current temperature data with the corresponding pseudo temperatures. For example, $(PseudoT_{min}+c) \geq MeasuredT_{min} \geq (PseudoT_{min}-c)$, where c is a temperature constant, for example 10° F. Similarly, $(PseudoT_{max}+c) \geq MeasuredT_{max} \geq (PseudoT_{max}-c)$, where c is the temperature constant. If the validity test indicates that the current measured temperatures are erroneous, the controller can substituted the pseudo temperatures for the measured temperatures.

Finally, if some accurate measured temperature data exists in the memory of irrigation controller 100, such as a 5-day average of $MeasuredT_{max}$ and $MeasuredT_{min}$ for any previous date, the irrigation controller can use those temperatures to shift or correct the respective $PseudoT_{max}$ and $PseudoT_{min}$ toward the predicted measured temperature values. This shift or $\Delta Pseudo$ temperature can be written as $\Delta PseudoT_{max}=(SR(date) \times B_{max}(conversion\ factor)+5-DayAveragedT_{max}(date))/SR(date) \times B_{max}(conversion\ factor)$ and $\Delta PseudoT_{min}=(SR(date) \times B_{min}(conversion\ factor)+5-DayAveragedT_{min}(date))/SR(date) \times B_{min}(conversion\ factor)$. The use of 5-day averaged temperatures is merely exemplary and those values may be substituted with any measured temperature value received at an identifiable date prior to the current date, for example $MeasuredT_{max}(date-n)$ and $MeasuredT_{min}(date-n)$. The $\Delta Pseudo$ temperature is then applied to the corresponding pseudo temperature. Alternatively, the $\Delta Pseudo$ can be constructed as a scalar value that is applied equally across all values of the corresponding pseudo temperature. It is, however, possible that the averaged measured temperature values (or the like) in memory might also contain an error, hence, the upper and lower value limits for $CorrPseudoT_{min}$ and $CorrPseudoT_{max}$ should be constrained, for example $(PseudoT_{max}+d) \geq CorrPseudoT_{max} \geq (PseudoT_{max}-d)$, where d is a temperature constant and $(PseudoT_{min}+d) \geq CorrPseudoT_{min} \geq (PseudoT_{min}-d)$, where d is also temperature constant. Thus, the corrected pseudo temperatures ($CorrPseudoT_{max}$ and $CorrPseudoT_{min}$) are constrained within a 2d range of temperatures, for example 20° F. where d=10° F.

With reference to a specific example, as shown in FIG. 3, values for $MeasuredT_{min}$ and $MeasuredT_{max}$ are received by the irrigation controller until the latter part of March when the sensor fails. It can be seen from the diagram that the 5 day averages of $MeasuredT_{min}$ and $MeasuredT_{max}$ are slightly higher than the calculated values for $PseudoT_{min}$ and $PseudoT_{max}$, consequently the pseudo temperature values are slightly in error and it is expected that the ET water deficit values calculated from the pseudo temperatures would also be slightly off. Therefore, the 5 day averages of $MeasuredT_{max}$ and $MeasuredT_{min}$ are used to construct $\Delta PseudoT_{max}$ and $\Delta PseudoT_{min}$ for correcting $PseudoT_{max}$ and $PseudoT_{min}$, i.e., $CorrPseudoT_{max}$ and $CorrPseudoT_{min}$. For example, $\Delta PseudoT_{max}=(SR(date) \times B_{max}(conversion\ factor)+5-DayAveragedT_{max}(date))/SR(date) \times B_{max}(conversion\ factor)$, and similarly $\Delta PseudoT_{min}=(SR(date) \times B_{min}(conversion\ factor)+5-DayAveragedT_{min}(date))/SR(date) \times B_{min}(conversion\ factor)$. Then, $CorrPseudoT_{max}=(SR(date) \times B_{max}(conversion\ factor)) \times (1+\Delta PseudoT_{max})$ and $CorrPseudoT_{min}=(SR(date) \times B_{min}(conversion\ factor)) \times (1+\Delta PseudoT_{min})$.

Recall that it may be also advantageous to shift the date for the solar radiation values. As can be seen from the diagram, the corrected pseudo temperature values more accurately predict the character of the measured temperatures ($CorrPseudoT_{max}$ and $CorrPseudoT_{min}$) and, therefore, provide a better solution when used with the ET algorithm (notice that the $CorrPseudoT_{max}$ and $CorrPseudoT_{min}$ curves remain slightly higher than the respective $PseudoT_{max}$ and $PseudoT_{min}$ in the identical manner as the $MeasuredT_{max}$ and $MeasuredT_{min}$, at the time prior to the sensor failing.

It is understood that pseudo temperature data may be derived from sources other than solar radiation, for instance, the controller uses a default temperature differential value stored in memory. Then, the operator modifies this value in a variety of ways: an operator-provided high and low temperature for the peak season—100° F. high and 80° F. low; an operator-provided temperature differential, for example 15° F.; a default temperature differential modified by the operator for climate type, for example 15° F., with $ET_0$ adjusted up +15% for operator selection of arid climate; 15° F. default with −15% adjustment to $ET_0$ for cooler/moderate climates; and the operator selects climate type from a diagram similar to that shown in FIG. 4 and a default temperature differential is supplied that applies for each climate type.

In any case, the creation of pseudo temperatures enables advanced irrigation controllers to operate in auto adjust watering mode without communication from a temperature sensor and further enables the controller to verify the integrity of the measured temperature data prior to using it.

Figure 5A:
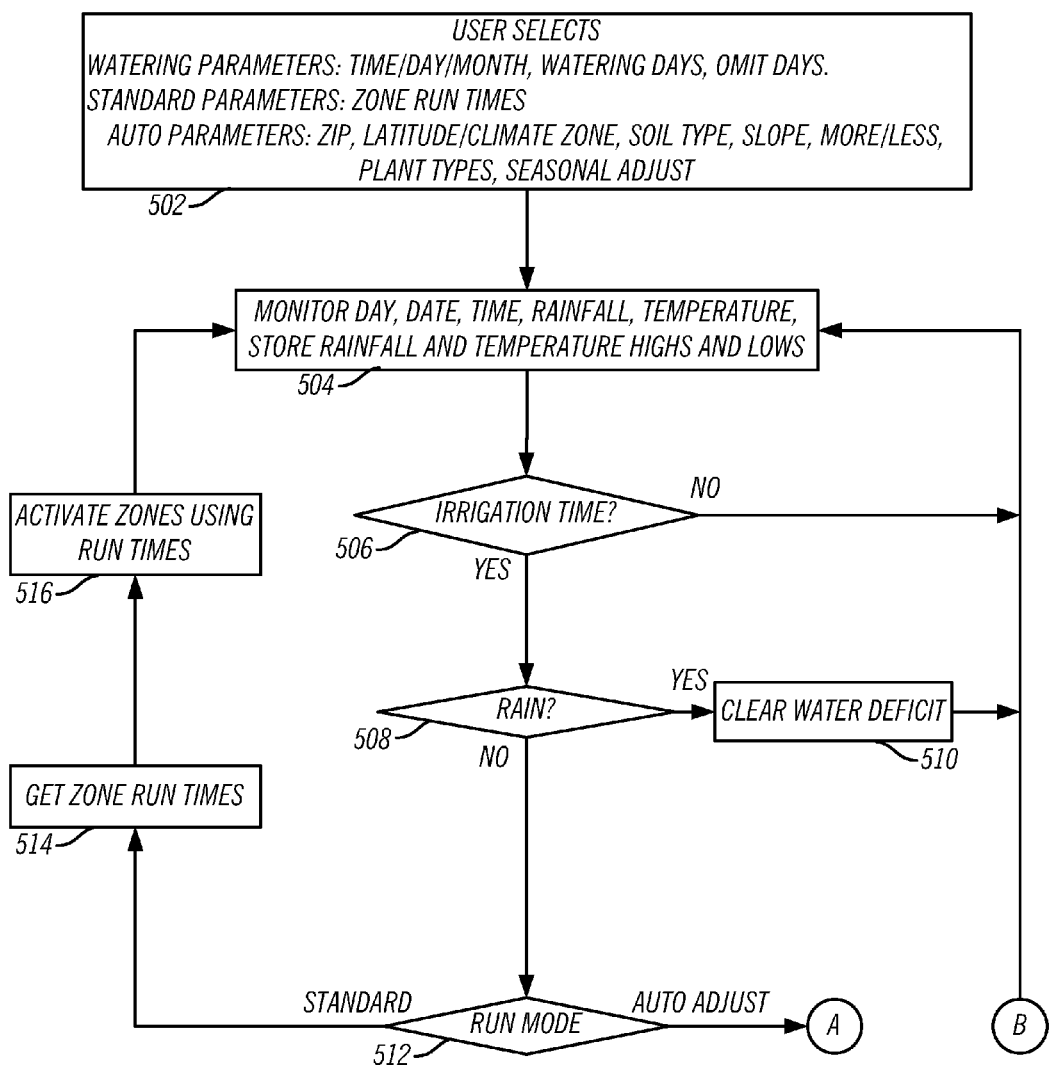
FIGS. 5A and 5B are a flowchart of the watering modes of an advanced irrigation controller utilizing pseudo temperatures derived from the solar radiation at the site in accordance with exemplary embodiments of the present invention.
Figure 5B:
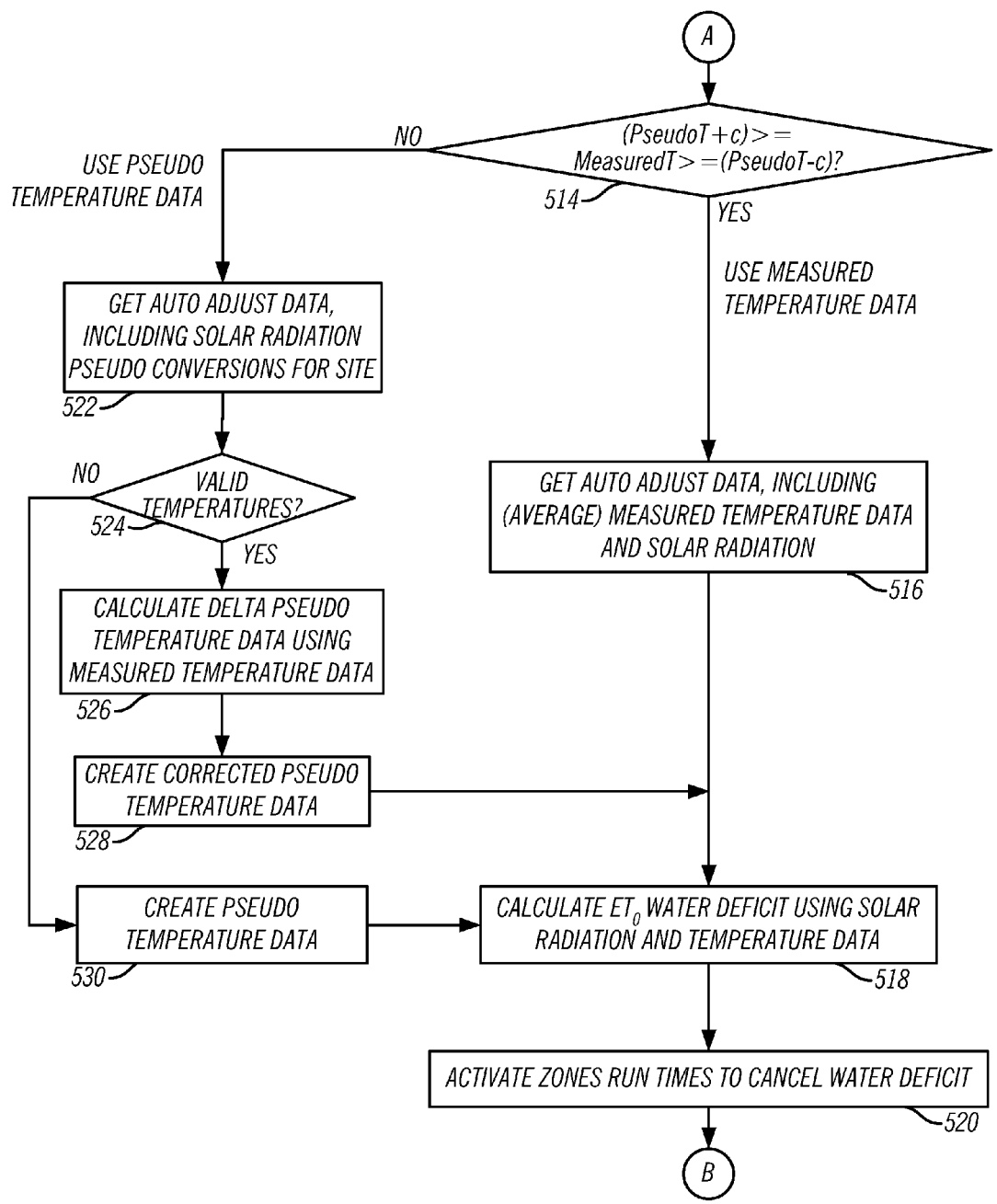

FIGS. 5A and 5B is a flowchart of the watering modes of an advanced irrigation controller utilizing pseudo temperatures derived from the solar radiation at the site in accordance with exemplary embodiments of the present invention. The process begins as described above for FIG. 2, except the operator selects either the ZIP code or the latitude with a climate type for the site (step 502). With this information, the controller identifies a set of pseudo temperature conversions for the site, at least one set of conversions for converting solar radiation to a pseudo maximum temperature ($PseudoT_{max}$) and a second set of conversions for converting solar radiation to a pseudo minimum temperature ($PseudoT_{min}$). As discussed elsewhere above, using the presently described invention, the solar radiation can be converted into any type of temperature data that can be used for calculating a water deficit for the site.

In RUN mode, advanced irrigation controller 100 continually monitors day, date, time, temperatures, and rainfall, and the controller stores rainfall events and the high and low temperatures (step 504), while checking for an irrigation time (step 506). At irrigation time, the exemplary watering program checks its memory for a rain event (step 508), if one occurred since the previous watering cycle, the controller assumes that the plant watering needs have been met by the rain, clears any water deficit (step 510) and returns to the monitoring state at step 504. If no rain event has occurred, the controller then determines which watering mode process to invoke from the operating mode selection in operating mode section 160 (step 512). In standard watering mode the controller gets the zone run times from memory (step 514) and activates the zones using the run times (step 516). The process then reverts to step 504.

If, at step 512, the controller is operating in auto adjust watering mode, the controller tests the current measured temperature values from the temperature sensor against the corresponding pseudo temperature values created for the site using the solar radiation (step 514). It is expected that the current values for $MeasuredT_{max}$ and $MeasuredT_{min}$ will fall within a predetermined temperature range of 2c degrees of the respective values for $PseudoT_{max}$ and $PseudoT_{min}$, hence $(PseudoT_{max}+c) \geq MeasuredT_{max} \geq (PseudoT_{max}-c)$ and $(PseudoT_{min}+c) \geq MeasuredT_{min} \geq (PseudoT_{min}-c)$. In practice, the temperature ranges for $PseudoT_{max}$ and $PseudoT_{min}$ may be different. If the current measured values for $MeasuredT_{max}$ and $MeasuredT_{min}$ are within c degrees of the respective pseudo temperatures, the current measured temperatures are within the ranges of valid values for the date and may be used for calculating an ET water deficit for the site. Therefore, the controller gets the auto adjust data from memory including the current measured temperatures (these temperatures may be averaged over a predetermined time period) and the solar radiation (step 516) and inserts the values into an evapotranspiration algorithm such as the Hargraves' algorithm, modified Hargraves', Penman-Monteith or others, for finding an ET water deficit (step 518). The irrigation zones are activated with run times sufficient to cancel at least part of the water deficit (step 520). The process then reverts to step 504.

If, however, at step 514, the current temperature values for one or both of $MeasuredT_{max}$ and $MeasuredT_{min}$ fall outside the respective temperature ranges for $PseudoT_{max}$ and $PseudoT_{min}$, the current measured temperature data are suspect and cannot be used to obtain a reliable and valid ET water deficit. In this situation, the presently described process uses the pseudo temperatures with the ET algorithm in auto adjust watering mode rather than failing over to the standard watering mode as in the prior art. Since the pseudo temperatures represent an accurate presumption of the current measured temperatures based on historic temperature data, using the pseudo temperatures will result in more reliable water deficit solution than using corrupt and/or invalid current measured temperatures. The controller gets the auto adjust data from memory including the solar radiation data and the pseudo conversions for the site (step 522). At this point, the controller may have valid temperatures for days prior to the current date, such as the case where the temperature sensor fails at the current date. The controller tests the temperatures in memory against the pseudo temperatures (step 524). These non-current measured temperature values will usually be an averaged value, perhaps from the previous day or the previous irrigation cycle, for example $5\text{-DayAveragedT}_{max}$ and $5\text{-DayAveragedT}_{min}$. It is expected that any non-current measured temperatures in memory have already passed the test in step 514, however, it is possible that the memory contains a default value of the like, so the non-current temperatures may be tested for validity as described above. If either of the non-current temperature values $MeasuredT_{max}$ or $MeasuredT_{min}$ (alternatively, $5\text{-DayAveragedT}_{min}$ or $5\text{-DayAveragedT}_{max}$) falls outside the respective temperature ranges for $PseudoT_{max}$ and $PseudoT_{min}$, no valid temperatures are present in memory, and the process proceeds with the creation of $PseudoT_{max}$ and $PseudoT_{min}$ for the current date (step 530) and inserts the values for $PseudoT_{max}$ and $PseudoT_{min}$ into the ET water deficit algorithm (step 518). This ET water deficit will approximate, but not usually duplicate, an ET water deficit using valid current temperature values for $MeasuredT_{max}$ and $MeasuredT_{min}$. The irrigation zones are activated for run times to cancel out the water deficit (step 520). It should be appreciated that at step 530, the pseudo temperature data probably already exists in the controller as it is used for testing the current measured temperature values at step 514 and perhaps step 524, hence the step of "creating pseudo temperature data" might more accurately be described as retrieving the pseudo temperature data.

Returning to step 524, if some valid non-current but date-identifiable measured temperatures are resident in memory (e.g., $MeasuredT_{max}(\text{date-n})$ and $MeasuredT_{min}(\text{date-n})$ or $AveragedT_{max}$ and $AveragedT_{min}$), these measured temperature values can be used for correcting or shifting the pseudo temperature values toward the respective measured temperature values from a comparison of the pseudo and measured temperature values, e.g., $\Delta PseudoTemp$ (step 526). This step is usually invoked after a temperature sensor fails, where the sensor has previously communicated some usable measured temperature data to the controller. That measured temperature data, though not current, can be used as a metric for comparing pseudo temperature data for a matching non-current date. Any differences between the two data sets will provide a basis for establishing a $\Delta PseudoTemp$ for correcting the conversion factors, for example $B_{max}$ and $B_{min}$. Because $\Delta PseudoTemp$ may be acceptable for use to correct pseudo temperature data across a range of dates, the non-current measured temperature data used for the comparison may be days, weeks or even months old. With regard to an exemplary comparison, $\Delta PseudoTemp$ can be written as $\Delta PseudoT_{max}=(SR(\text{date}) \times B_{max}(\text{conversion factor})+5\text{-DayAveragedT}_{max}(\text{date}))/SR(\text{date}) \times B_{max}(\text{conversion factor})$ and $\Delta PseudoT_{min}=(SR(\text{date}) \times B_{min}(\text{conversion factor})+5\text{-DayAveragedT}_{min}(\text{date}))/SR(\text{date}) \times B_{min}(\text{conversion factor})$. As discussed above, the value of date is relatively unimportant, however, optimally, temporal measured temperature data is used for the comparison. The $\Delta PseudoTemp$ can be applied relationally to the pseudo temperature values or as a scalar offset across the yearly range of pseudo temperatures to correct the pseudo temperatures toward the measured temperatures (step 528). For example, as $CorrPseudoT_{max}=(SR(\text{date}) \times B_{max}(\text{conversion factor})) \times (1+\Delta PseudoT_{max})$ and $CorrPseudoT_{min}=(SR(\text{date}) \times B_{min}(\text{conversion factor})) \times (1+\Delta PseudoT_{min})$. The corrected pseudo temperatures are then used in the ET algorithm with the solar radiation for a water deficit (step 518), and the irrigation zones activated with run times sufficient to cancel at least some of the water deficit (step 520). The process then reverts to step 504 and continues to iterate through step 506 to 530 as necessary.

As may be readily appreciated and understood from the foregoing, utilizing solar radiation data for computing pseudo temperature data used with ET calculations in an advanced irrigation controller is not analogous to adjusting irrigation schedules for seasonal percentage adjustments by month. Initially, the present paradigm of substituting pseudo data for measured data allows for custom programming for each irrigation zone to match the sprinkler, soil and plant types, slope, and root depth information; eliminating the need for attempting to guess and appropriate irrigation schedule. The presently described invention automatically adjusts seasonally without guessing at the seasonal percentage adjustment, even without measured temperature data or far different and As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Moreover, the computer readable medium may include a carrier wave or a carrier signal as may be transmitted by a computer server including internets, extranets, intranets, world wide web, ftp location or other service that may broadcast, unicast or otherwise communicate an embodiment of the present invention. The various embodiments of the present invention may be stored together or distributed, either spatially or temporally across one or more devices.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The exemplary embodiments described below were selected and described in order to best explain the principles of the invention and the practical application, and to enable others of ordinary skill in the art to understand the invention for various embodiments with various modifications as are suited to the particular use contemplated. The particular embodiments described below are in no way intended to limit the scope of the present invention as it may be practiced in a variety of variations and environments without departing from the scope and intent of the invention. Thus, the present invention is not intended to be limited to the embodiment shown, but is to be accorded the widest scope consistent with the principles and features described herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprising," "including," "containing," "characterized by," and grammatical equivalents thereof, when used in this specification, are inclusive or open-ended terms that specify the presence of stated features, integers, steps, operations, elements, and/or components, but do not preclude the presence or addition of one or more other features, integers, steps, operations, elements, components, and/or groups thereof.

What is claimed is:

1. A method for operating an advanced irrigation controller, said advanced irrigation controller capable of receiving communications from a temperature sensor and coupled to a plurality of irrigation values for controlling an irrigation run time for each plurality of irrigation values for regulating irrigation water to a plurality of irrigation zones on a site, said method comprising:

receiving day, date and time information and site location information for the site at the advanced irrigation controller;

finding a current solar radiation value from the site location information and a current date;

finding a pseudo temperature data conversion from the site location information;

creating, by the advanced irrigation controller, current pseudo temperature data from the pseudo temperature data conversion, the current solar radiation value and the current date;

receiving current measured temperature data from the temperature sensor;

creating, by the advanced irrigation controller, the current measured temperature data with the current pseudo temperature data;

calculating, by the advanced irrigation controller, a water amount for the site from the current solar radiation value and one of the current measured temperature data and the current pseudo temperature data; and activating, by the advanced irrigation controller, the plurality of irrigation values using the water amount for the site for activating run times of the plurality of irrigation values.

2. The method recited in claim 1 above, wherein the site location information further comprises one of an address for the site, a ZIP code for the site, a latitude and climatic condition information for the site, a latitude and a longitude for the site and a coordinate description for the site.

3. The method recited in claim 1 above, wherein pseudo temperature data comprises one of minimum and maximum pseudo temperatures over a preset time period; average and differential pseudo temperatures over a preset time period; minimum and offset pseudo temperatures over a preset time period; maximum and offset pseudo temperatures over a preset time period; minimum pseudo temperature over a preset time period; maximum pseudo temperature over a preset time period; and median pseudo temperature over a preset time period, and wherein the current measured temperature data comprises one of minimum and maximum measured temperatures over a preset time period; average and differential measured temperatures over a preset time period; minimum and offset measured temperatures over a preset time period; maximum and offset measured temperatures over a preset time period; minimum measured temperature over a preset time period; maximum measured temperature over a preset time period; and median measured temperature over a preset time period.

4. The method recited in claim 1 above, wherein pseudo temperature data comprises a minimum pseudo temperature over a preset time period and a pseudo maximum temperature over the preset time period and wherein the current measured temperature data comprises a minimum measured temperature over the preset time period and a maximum measured temperature over the preset time period.

5. The method recited in claim 1 above, wherein comparing the current measured temperature data with the current pseudo temperature data further comprises:
setting a temperature tolerance for the current pseudo temperature data; and
determining whether the current measured temperature data matches the current pseudo temperature data within the temperature tolerance.

6. The method recited in claim 5 above, wherein calculating the water amount for the site from the current solar radiation value and one of the current measured temperature data and the current pseudo temperature data further comprises:
using the current measured temperature for calculating the water amount in response to the current measured temperature data matching the current pseudo temperature data within the temperature tolerance.

7. The method recited in claim 5 above, wherein calculating a water amount for the site from the current solar radiation value and one of the current measured temperature data and the current pseudo temperature data further comprises:
using the current pseudo temperature data for calculating the water amount in response to the current measured temperature data not matching the current pseudo temperature data within the temperature tolerance.

8. The method recited in claim 1 above, wherein creating current pseudo temperature data from the pseudo temperature data conversion, the current solar radiation value and the current date further comprises:
creating pseudo temperature data from solar radiation data for the site and the pseudo temperature data conversion; and
deriving current pseudo temperature data from the pseudo temperature data and the current date.

9. The method recited in claim 1 above, wherein calculating a water amount for the site from the current solar radiation value and one of the current measured temperature data and the current pseudo temperature data further comprises:
calculating an evapotranspiration value.

10. The method recited in claim 9 above further comprises:
receiving a second evapotranspiration value from an external source;
comparing the evapotranspiration value with the second evapotranspiration value; and
adjusting the evapotranspiration value toward the second evapotranspiration value.

11. The method recited in claim 1 above, wherein the site location information further comprises one of climatic condition information and a coordinate description for the site and one of an address for the site, a ZIP code for the site, a latitude and, a latitude and a longitude for the site.

12. A method for operating an advanced irrigation controller, said advanced irrigation controller capable of receiving communications from a temperature sensor and storing said communications in a controller memory and said advanced irrigation controller being coupled to a plurality of irrigation values for controlling an irrigation run time for each plurality of irrigation values for regulating irrigation water to a plurality of irrigation zones at a site, said method comprising:
receiving day, date and time information and site location information for the site at the advanced irrigation controller;
accessing the controller memory for current measured temperature data received from the temperature sensor;
finding a current solar radiation value from the site location information and a current date;
finding a pseudo temperature data conversion from the site location information;
creating, by the advanced irrigation controller, current pseudo temperature data from the pseudo temperature data conversion, the current solar radiation value and the current date;
calculating, by the advanced irrigation controller, a water deficit for the site from the current solar radiation value and the current pseudo temperature data; and
activating, by the advanced irrigation controller, the plurality of irrigation values using the water deficit for the site for activating run times of the plurality of irrigation values sufficient to cancel at least a portion of the water deficit.

13. The method recited in claim 12 above, wherein the site location information further comprises one of an address for the site, a ZIP code for the site, a latitude and climatic condition information for the site, a latitude and a longitude for the site, a coordinate description for the site.

14. The method recited in claim 12 above, wherein pseudo temperature data comprises one of minimum and maximum temperatures over a preset time period; average and differential temperatures over a preset time period; minimum and offset temperatures over a preset time period; maximum and offset temperatures over a preset time period; minimum temperature over a preset time period; maximum temperature over a preset time period; and median temperature over a preset time period.

15. The method recited in claim 12 above, wherein pseudo temperature data comprises a minimum temperature over a preset time period and a maximum temperature over the preset time period.

16. The method recited in claim 12 above, wherein accessing the controller memory for current measured temperature data received from the temperature sensor further comprises:
 determining the current measured temperature data is absent in the controller memory.

17. The method recited in claim 12 above, wherein accessing the controller memory for current measured temperature data received from the temperature sensor further comprises:
 determining the current measured temperature data is absent in the controller memory;
 finding non-current measured temperature data in the controller memory for a previous date;
 creating corrected pseudo temperature data, comprising:
  creating non-current pseudo temperature data from the pseudo temperature data conversion, the current solar radiation value and the previous date;
  comparing the non-current measured temperature data with the non-current pseudo temperature data;
  establishing a correction factor for use with the pseudo temperature data conversion; and
  creating current corrected pseudo temperature data from the pseudo temperature data conversion with the correction factor, the current solar radiation value and the current date.

18. The method recited in claim 17 above, wherein creating current pseudo temperature data from the pseudo temperature data conversion, the current solar radiation value and the current date further comprises:
 creating current pseudo temperature data from the pseudo temperature data conversion with the correction factor, the current solar radiation value and the current date calculating the water deficit for the site from the current solar radiation value and the current corrected pseudo temperature.

19. The method recited in claim 12 above, wherein calculating a water deficit for the site from the current solar radiation value and the current pseudo temperature data further comprises:
 calculating an evapotranspiration value.

20. The method recited in claim 19 above further comprises:
 receiving a second evapotranspiration value from an external source;
 comparing the evapotranspiration value with the second evapotranspiration value; and
 adjusting the evapotranspiration value toward the second evapotranspiration value.

21. The method recited in claim 12 above, wherein the site location information further comprises one of climatic condition information and a coordinate description for the site and one of an address for the site, a ZIP code for the site, a latitude and, a latitude and a longitude for the site.

22. A method for operating an advanced irrigation controller, said advanced irrigation controller coupled to a plurality of irrigation values for controlling an irrigation run time for each plurality of irrigation values for regulating irrigation water to a plurality of irrigation zones at a site, said method comprising:
 receiving day, date and time information and site location information for the site at the advanced irrigation controller;
 finding solar radiation data from the site location information;
 finding a current solar radiation value from the solar radiation date for a current date;
 finding pseudo temperature data for the site, wherein the pseudo temperature data is created by the advanced irrigational controller from the solar radiation value and a pseudo temperature data conversion;
 finding current pseudo temperature data from the pseudo temperature data for the current date; and
 calculating, by the advanced irrigation controller, a current irrigation water quantity for the site from evapotranspiration algorithm using the current pseudo temperature data and the current solar radiation value with an evapotranspiration algorithm.

23. The method recited in claim 22 above, wherein finding pseudo temperature data for the site further comprising:
 receiving pseudo temperature data from a source external to the advanced irrigation controller.

24. The method recited in claim 22 above, wherein finding pseudo temperature data for the site further comprising:
 creating pseudo temperature data from the solar radiation value.

25. The method recited in claim 22 above, wherein finding pseudo temperature data for the site further comprising:
 finding climatic condition information for the site; and
 creating pseudo temperature data from the solar radiation value and the climatic condition information.

26. The method recited in claim 22 above, wherein pseudo temperature data comprises one of minimum and maximum pseudo temperatures over a preset time period; average and differential pseudo temperatures over a preset time period; minimum and offset pseudo temperatures over a preset time period; maximum and offset pseudo temperatures over a preset time period; minimum pseudo temperature over a preset time period; maximum pseudo temperature over a preset time period; and median pseudo temperature over a preset time period.

27. The method recited in claim 22 above, wherein pseudo temperature data comprises a minimum pseudo temperature over a preset time period and a maximum pseudo temperature over the preset time period.

28. The method recited in claim 22 above, wherein the site location information further comprises one of an address for the site, a ZIP code for the site, a latitude and climatic condition information for the site, a latitude and a longitude for the site and a coordinate description for the site.

29. The method recited in claim 28 above further comprising:
 finding non-current measured temperature data in the controller memory for a previous date;
 creating corrected pseudo temperature data, comprising:
  finding a pseudo temperature data conversion from the site location information;
  creating non-current pseudo temperature data from the pseudo temperature data conversion, the solar radiation data and the previous date;
  comparing the non-current measured temperature data with the non-current pseudo temperature data;
  establishing a correction factor for use with the pseudo temperature data conversion; and creating corrected pseudo temperature data from the pseudo temperature data conversion with the correction factor, the solar radiation value and the current date.

30. The method recited in claim 22 above, wherein pseudo temperature data comprises a minimum pseudo temperature over a preset time period and a maximum pseudo temperature over the preset time period.

31. The method recited in claim 22 above, wherein using the current pseudo temperature data and the current solar radiation value with an evapotranspiration algorithm further comprises:
  calculating a current evapotranspiration value;
  receiving a second current evapotranspiration value from an external source;
  comparing the current evapotranspiration value with the second current evapotranspiration value; and
  adjusting the current evapotranspiration value toward the second current evapotranspiration value.

32. The method recited in claim 22 above, wherein the site location information further comprises one of climatic condition information and a coordinate description for the site and one of an address for the site, a ZIP code for the site, a latitude and, a latitude and a longitude for the site.

* * * * *